United States Patent
Becker et al.

(10) Patent No.: US 7,629,411 B2
(45) Date of Patent: Dec. 8, 2009

(54) METHOD FOR PRODUCING (POLY-C2-C4 ALKYLENE GLYCOL)-MONO(METH)ACRYLIC ESTERS

(75) Inventors: Stefan Becker, Mannheim (DE); Joerg Pastre, Bensheim (DE); Joachim Pakusch, Speyer (DE); Thomas Goetz, Leimersheim (DE); Arnold Burek, Ludwigshafen (DE); Wolfgang Hansch, Schwegenheim (DE); Stefanie Spilger, Schwetzingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 224 days.

(21) Appl. No.: 11/574,587

(22) PCT Filed: Sep. 2, 2005

(86) PCT No.: PCT/EP2005/009466

§ 371 (c)(1),
(2), (4) Date: Mar. 2, 2007

(87) PCT Pub. No.: WO2006/024538

PCT Pub. Date: Mar. 9, 2006

(65) Prior Publication Data

US 2008/0275166 A1    Nov. 6, 2008

(30) Foreign Application Priority Data

Sep. 3, 2004   (DE) .................. 10 2004 042 799

(51) Int. Cl.
*C08F 290/06* (2006.01)

(52) U.S. Cl. ............... 524/558; 524/556; 526/319; 526/320; 526/328.5; 560/224; 568/616

(58) Field of Classification Search ............... None
See application file for complete search history.

(56) References Cited

U.S. PATENT DOCUMENTS

| 4,075,411 | A | 2/1978 | Dickstein |
| 6,048,916 | A * | 4/2000 | Hirata et al. ............... 524/5 |
| 6,268,521 | B1 * | 7/2001 | Gruning et al. ........... 560/209 |
| 6,383,279 | B1 | 5/2002 | Eckhardt et al. |
| 6,780,928 | B1 * | 8/2004 | Itoh et al. ................ 524/599 |
| 2002/0193547 | A1 | 12/2002 | Yuasa et al. |
| 2003/0203011 | A1 * | 10/2003 | Abuelyaman et al. ...... 424/445 |

FOREIGN PATENT DOCUMENTS

| DE | 1110866 | 7/1961 |
| EP | 670 341 | 9/1995 |
| FR | 2 739 850 | 4/1997 |
| WO | 01 74736 | 10/2001 |

OTHER PUBLICATIONS

Schuchardt et al. (J. Braz. Chem. Soc., 9(1), 1998, 199-210).*
U.S. Appl. No. 12/092,586, filed May 5, 2008, Becker et al.

* cited by examiner

*Primary Examiner*—David Wu
*Assistant Examiner*—Vu Nguyen
(74) *Attorney, Agent, or Firm*—Oblon, Spivak, McClelland, Maier & Neustadt, L.L.P.

(57) ABSTRACT

A process for preparing poly-$C_2$-$C_4$-alkylene glycol mono (meth)acrylic acid esters by reacting (meth)acrylic anhydride with a poly-$C_2$-$C_4$-alkylene glycol carrying at least one OH group in the presence of abase having a solubility in the poly-$C_2$-$C_4$-alkylene glycol of not more than 10 g/l at 90° C.

24 Claims, No Drawings

METHOD FOR PRODUCING (POLY-C2-C4 ALKYLENE GLYCOL)-MONO(METH)ACRYLIC ESTERS

The present invention relates to a process for the preparation of poly-$C_2$-$C_4$-alkylene glycol monoacrylic acid esters and monomethacrylic acid esters, and a process for the preparation of copolymers of such poly-$C_2$-$C_4$-alkylene glycol mono(meth)acrylic acid esters with acrylic acid or methacrylic acid.

The monoesters of poly-$C_2$-$C_4$-alkylene glycols with acrylic acid or methacrylic acid, also referred to below as poly-$C_2$-$C_4$-alkylene glycol mono(meth)acrylic acid esters, are interesting macromonomers which are used for the preparation of comb polymers having poly-$C_2$-$C_4$-alkylene ether side chains. Owing to their surface-active properties, the latter have various uses, for example as detergent additives, such as encrustation inhibitors, graying inhibitors and soil release agents, and as coating raw materials, additives for active substance preparations in medicine and in crop protection.

Anionic comb polymers having poly-$C_2$-$C_4$-alkylene ether side chains and carboxylate groups on the polymer backbone, in particular those having $C_1$-$C_{10}$-alkylpolyethylene glycol side chains, are used, for example, as plasticizers for mineral binding building materials, in particular cement-containing binding building materials, such as mortar, cement-bound renders and in particular concrete.

The preparation of poly-$C_2$-$C_4$-alkylene glycol mono(meth)acrylic acid esters is usually effected by derivatizing a poly-$C_2$-$C_4$-alkylene glycol carrying OH groups with acrylic acid or methacrylic acid or an ester-forming derivative thereof, Owing to the macromolecular nature of the starting material and end product, the reaction rates of such reactions are low. Moreover, working-up and isolation of the reaction products is problematic, not least because of the surface-active properties of such substances, so that a selective and substantially complete reaction of the poly-$C_2$-$C_4$-alkylene glycol is necessary for the quality of the product obtained.

DE-A 1110866 describes, inter alia, the reaction of monoalkylpolyalkylene glycols with acid chlorides of ethylenically unsaturated carboxylic acids, the acid chloride being used in excess. The resulting crude product of the ester does of course still contain unreacted excess acid chloride, which interferes in further reactions and has to be removed in an expensive manner by distillation. The quality of the poly-$C_2$-$C_4$-alkylene glycol mono(meth)acrylic acid esters thus prepared is not satisfactory.

U.S. Pat. No. 4,075,411 describes the preparation of alkylphenoxy(polyethylene glycol) monoesters of olefinically unsaturated carboxylic acids by esterification of polyethylene glycol mono(alkylphenyl)ethers with the corresponding acid in the presence of p-toluenesulfonic acid or by reaction with the acid chloride in the presence of an amine. The conversions achieved and the quality of the alkylphenoxy(polyethylene glycol) monoesters thus prepared are not satisfactory.

WO 01/74736 describes a process for the preparation of copolymers of poly-$C_2$-$C_4$-alkylene glycol mono(meth)acrylic acid esters with acrylic acid or methacrylic acid by copolymerization of these monomers, the preparation of the poly-$C_2$-$C_4$-alkylene glycol mono(meth)acrylic acid esters being effected by reaction of polyalkylene glycols with (meth)acrylic anhydrides in the presence of amines. For this purpose, the anhydride is used in an excess of at least 10 mol %, based on the stoichiometry of the reaction. In spite of this excess, the rate of the esterification is low. Investigations by the inventors themselves have moreover shown that the conversions achieved in the esterification are low and the esters thus prepared also comprise, in addition to free anhydride, considerable amounts of unreacted polyalkylene glycols, which adversely affect the quality of the subsequently prepared polymers, in particular with respect to their use as concrete plasticizers.

It is therefore the object of the present invention to provide a process for the preparation of poly-$C_2$-$C_4$-alkylene glycol mono(meth)acrylic acid esters which gives these compounds in high quality and with acceptable reaction rates.

It was surprisingly found that this object can be achieved by a process in which acrylic anhydride or methacrylic anhydride is reacted with a poly-$C_2$-$C_4$-alkylene glycol compound carrying at least one OH group in the presence of a base, the base being selected from basic compounds which have a solubility of not more than 10 g/l at 90° C., and (meth)acrylic anhydride A and poly-$C_2$-$C_4$-alkylene glycol compound P being used in a molar ratio A:P in the range from 1:1 to 1.095:1.

The present invention therefore relates to a process for the preparation of poly-$C_2$-$C_4$-alkylene glycol monoacrylic acid esters and monomethacrylic acid esters by reacting acrylic anhydride or methacrylic anhydride ((meth)acrylic anhydride A below) with a poly-$C_2$-$C_4$-alkylene glycol compound P carrying at least one OH group in the presence of a base, the base being selected from basic compounds which have a solubility in the poly-$C_2$-$C_4$-alkylene glycol compound P of not more than 10 g/l at 90° C., and the molar ratio of (meth)acrylic anhydride A to compound P (molar ratio A:P) being in the range from 1:1 to 1.095:1, preferably in the range from 1.005:1 to 1.09:1, in particular in the range from 1.01:1 to 1.065:1 and particularly preferably in the range from 1.02:1 to 1.03:1.

The process according to the invention is associated with a number of advantages. Firstly, the reaction of the (meth)acrylic anhydride with the compound P takes place substantially more rapidly than in the processes of the prior art so that substantially shorter reaction times are required for comparable conversions. Moreover, higher conversions are achieved. It was furthermore surprisingly found that the copolymers of the esters thus prepared have a substantially better plasticizing effect in cement-containing binding building material preparations than comparable products of the prior art.

The present invention therefore also relates to a process for the preparation of copolymers of (meth)acrylic acid with poly-$C_2$-$C_4$-alkylene glycol mono(meth)acrylic acid esters, comprising:

i) preparation of a poly-$C_2$-$C_4$-alkylene glycol mono(meth)acrylic acid ester by reacting (meth)acrylic anhydride A with a poly-$C_2$-$C_4$-alkylene glycol compound P carrying at least one OH group in the presence of a base by processes according to the invention and ii) free-radical copolymerization of the poly-$C_2$-$C_4$-alkylene glycol mono(meth)acrylic acid ester obtained in step i) with acrylic acid and/or methacrylic acid and, if appropriate, further ethylenically unsaturated monomers.

The invention also relates to the copolymers thus prepared and the use thereof as concrete plasticizers.

Poly-$C_2$-$C_4$-alkylene glycol compounds P, which are also referred to variously as poly-$C_2$-$C_4$-alkylene oxides or poly(oxy-$C_2$-$C_4$-alkylene) compounds, are understood as meaning oligomeric or macromolecular polyethers having a plurality of repeating units, as a rule at least 3, frequently at least 10 and in particular at least 10 and as a rule not more than 400, frequently not more than 300, e.g. from 10 to 200 and in particular from 10 to 150, repeating units, which are derived from $C_2$-$C_4$-alkylene glycols. These compounds may be linear or branched and, as a rule, are on average at least one, usually terminal free OH group in the molecule. The other terminal groups may be, for example, OH groups, alkoxy groups having preferably 1 to 10 carbon atoms, phenoxy or benzyloxy groups, acyloxy groups having preferably 1 to 10 carbon atoms, O—SO$_3$H groups or O—PO$_3$H$_2$ groups, it also being possible for the two last-mentioned groups to be present as anionic groups. In a preferred embodiment, a poly-C$_2$-C$_4$-alkylene glycol compound D in which one terminal group is an OH group and the further term in a group(s) is (are) alkoxy group(s) having 1 to 10 and in particular 1 to 4 carbon atoms, such as ethoxy, n-propoxy, isopropoxy, n-butoxy, 2-butoxy or tert-butoxy and especially methoxy, is used.

Linear poly-C$_2$-C$_4$-alkylene glycol compounds having about one free OH group per molecule (i.e. about 0.9 to 1.1 free OH groups on average) are preferred. Such compounds can be described by the general formula P:

$$HO\text{-}(A\text{-}O)_n\text{—}R^1 \qquad (P)$$

where n indicates the number of repeating units and as a rule is a number in the range from 3 to 400, in particular in the range from 5 to 300, particularly preferably in the range from 10 to 200 and very particularly preferably in the range from 10 to 150, A is C$_2$-C$_4$-alkylene, such as 1,2-ethanediyl, 1,3-propanediyl, 1,2-propanediyl, 1,2-butanediyl or 1,4-butanediyl, and R$^1$ is hydrogen, alkyl having preferably 1 to 10 and in particular 1 to 4 carbon atoms, phenyl, benzyl, acyl (=C(O)-alkyl) having preferably 1 to 10 carbon atoms, SO$_3$H groups or PO$_3$H$_2$, in particular C$_1$-C$_{10}$-alkyl and particularly preferably C$_1$-C$_4$-alkyl and especially methyl or ethyl.

The process, according to the invention, for the preparation of poly-C$_2$-C$_4$-alkylene glycol mono(meth)acrylic acid esters in which at least 50% by weight, preferably at least 70% by weight, in particular at least 90% by weight and especially all of the repeating units in the poly-C$_2$-C$_4$-alkylene glycol compound P used are derived from glycol or from ethylene oxide is particularly suitable. Accordingly, preferably at least 50% by weight, in particular at least 70% by weight, very particularly preferably at least 90% by weight and especially all of the A-O units in the formula P are CH$_2$—CH$_2$—O. Such poly-C$_2$-C$_4$-alkylene glycols P are also preferred with regard to the use of the poly-C$_2$-C$_4$-alkylene glycol mono(meth) acrylic acid esters for the preparation of plasticizers for cement-containing preparations. Not least with regard to this use, R$^1$ in formula P is preferably an alkyl group having 1 to 10 and in particular having 1 to 4 carbon atoms and is especially methyl.

Accordingly, a very particularly preferred embodiment of the invention relates to a process in which the compound P is a polyethylene glycol (mono-C$_1$-C$_{10}$-alkyl)ether, i.e. a mono-C$_1$-C$_{10}$-alkyl ether, in particular a mono-C$_1$-C$_4$-alkyl ether and especially the methyl or ethyl ether of a linear polyethylene glycol.

Preferably, the poly-C$_2$-C$_4$-alkylene glycol compound P used has a number average molecular weight (determined by means of GPC) in the range from 250 to 20 000 and in particular in the range from 400 to 10 000.

According to the invention, for the preparation of the poly-C$_2$-C$_4$-alkylene glycol mono(meth)acrylic acid ester, the poly-C$_2$-C$_4$-alkylene glycol compound P is reacted with at least one mole equivalent of acrylic anhydride or methacrylic anhydride or a mixture thereof. Here and below, the expression (meth)acrylic anhydride denotes both acrylic anhydride or methacrylic anhydride and mixtures thereof. (Meth)acrylic anhydride can also be used in a small excess, which, however, will not exceed 9.5 mol %, preferably 9 mol %, in particular 8.5 mol % and especially 8 mol %, based on 1 mol of compound P. i.e. the amount of (meth)acrylic anhydride is, according to the invention, not more than 1.095 mol, preferably not more than 1.09 mol, in particular not more than 1.085 mol and especially not more than 1.08 mol per mole of compound P. Preferably, at least 1.005 mol, in particular at least 1.01 mol and particularly preferably at least 1.2 mol of (meth) acrylic anhydride per mole of compound P are used.

According to the invention, the reaction is effected in the presence of a base which is insoluble or only slightly soluble in the compound P at 90° C., i.e. the solubility of the base in the compound P at 90° C. is not more than 10 g/l and in particular not more than 5 g/l.

The examples of bases suitable according to the invention include hydroxides, oxides, carbonates and bicarbonates of monovalent or divalent metal cations, in particular of elements of the first and second main group of the Periodic Table of the Elements, i.e. of Li$^+$, Na$^+$, K$^+$, Rb$^+$, Cs$^+$, Be$^{2+}$, Mg$^{2+}$, Ca$^{2+}$, Sr$^{2+}$ and Ba$^{2+}$, and of monovalent or divalent transition metal cations, such as Ag$^+$, Fe$^{2+}$, Co$^{2+}$, Ni$^{2+}$, Cu$^{2+}$, Zn$^{2+}$, Cd$^{2+}$, Sn$^{2+}$, Pb$^{2+}$ and Ce$^{2+}$. The hydroxides, oxides, carbonates and bicarbonates of cations of the alkali metals and alkaline earth metals and of Zn$^{2+}$ are preferred, in particular of Mg$^{2+}$ or Ca$^{2+}$ and particularly preferably of Na$^+$ or K$^+$. Preferred among these are the hydroxides and carbonates of these metal ions, in particular the alkali metal carbonates and alkali metal hydroxides and especially sodium carbonate, potassium carbonate, potassium hydroxide and sodium hydroxide. Lithium hydroxide and lithium carbonate are also particularly suitable. The base is preferably used in an amount of from 0.05 to 0.5 base equivalent and in particular in an amount of from 0.1 to 0.4 base equivalent, based on the poly-C$_2$-C$_4$-alkylene glycol compound P, larger amounts of base, for example up to 1 base equivalent, generally not being disadvantageous. It should be taken into account here that, in the case of hydroxides and bicarbonates, the base equivalents correspond to the mole equivalents used, whereas 1 mole equivalent of a carbonate or oxide corresponds in each case to 2 base equivalents.

The reaction of the anhydride with the compound P is preferably effected at temperatures in the range from 0 to 150° C., in particular in the range from 20 to 130° C. and particularly preferably in the range from 50 to 100° C. The pressure prevailing during the reaction is of minor importance for the success of the reaction and is as a rule in the range from 800 mbar to 2 bar and frequently ambient pressure. The reaction is preferably carried out in an inert gas atmosphere. The reaction of the anhydride with the compound P can be carried out in all apparatuses customary for such reactions, for example in a stirred vessel or in stirred vessel cascades, autoclaves, tubular reactors or kneaders.

The reaction of the anhydride with the compound P is preferably carried out until a conversion of at least 80%, in particular at least 90% and particularly preferably at least 95% of the compound P used is achieved. The reaction times required for this purpose will not as a rule exceed 5 h and are frequently less than 4 h. The conversion can be monitored by $^1$H-NMR spectroscopy of the reaction mixture, preferably in the presence of a strong acid, such as trifluoroacetic acid.

The reaction of the anhydride with the compound P can be carried out in the absence of a solvent, i.e. without addition of solvents or in inert solvents or diluents. Inert solvents are as a rule aprotic compounds. The inert solvents include, if appropriate, halogenated aromatic hydrocarbons, such as toluene, o-xylene, p-xylene, cumene, chlorobenzene, ethylbenzene, industrial mixtures of alkylaromatics, aliphatic and cycloaliphatic hydrocarbons, such as hexane, heptane, octane, isooctane, cyclohexane, cycloheptane, industrial aliphatic mixtures, and furthermore ketones, such as acetone, methyl ethyl ketone and cyclohexanone, and furthermore ethers, such as tetrahydrofuran, dioxane, diethyl ether and tert-butyl methyl ether, and mixtures of the abovementioned solvents, such as, for example, toluene/hexane. The procedure is preferably effected without solvents or only with very small amounts of solvents, as a rule less than 10% by weight, based on the starting materials, i.e. in the absence of a solvent.

It has proven advantageous if the reaction of the anhydride with the compound P is carried out in a reaction medium which comprises less than 0.2% by weight and in particular less than 1000 ppm of water (determined by Karl Fischer titration). The term "reaction medium" relates to the mixture of the reactants A and P with the base and with any solvent or inhibitor used. In the case of moisture-containing starting materials, it has proven useful to remove the water before the reaction, for example by distillation and particularly preferably by distillation with addition of an organic solvent, which forms a low-boiling azeotrope with water. Examples of such solvents are the abovementioned aromatic solvents, such as toluene, o-xylene, p-xylene, cumene, benzene, chlorobenzene, ethylbenzene and industrial aromatic mixtures, furthermore aliphatic and cycloaliphatic solvents, such as hexane, heptane and cyclohexane, and industrial aliphatic mixtures and mixtures of the abovementioned solvents.

For the reaction, it is usual to adopt a procedure in which the reaction mixture, comprising the compound P, the anhydride and the base and, if appropriate, solvent and, if appropriate, inhibitor, is reacted in a suitable reaction vessel at the abovementioned temperatures. Preferably, the compound P and the base and, if appropriate, the solvent are initially taken and the anhydride is added thereto. The addition of the anhydride is preferably effected at reaction temperature.

If the starting materials comprise water, the water is preferably removed before the addition of the anhydride. For example, it is possible to adopt a procedure in which the compound P and the base and, if appropriate, the solvent are initially taken in a reaction vessel, any moisture present is then removed in the manner described above and the anhydride is then added, preferably at reaction temperature.

For avoiding an uncontrolled polymerization, it has also proven useful to carry out the reaction of the anhydride with the compound P in the presence of a polymerization inhibitor. The polymerization inhibitors known for such reactions are suitable, in particular phenols, such as hydroquinone, hydroquinone monomethyl ether, especially sterically hindered phenols, such as 2,6-di-tert-butylphenol or 2,6-di-tert-butyl-4-methylphenol, furthermore thiazines, such as phenothiazine or methylene blue, cerium(III) salts, such as cerium(III) acetate, and nitroxides, in particular sterically hindered nitroxides, i.e. nitroxides of secondary amines which in each case carry 3 alkyl groups on the carbon atoms which are adjacent to the nitroxide group, 2 each of these alkyl groups, in particular those which are not present on the same carbon atom, forming a saturated 5- or 6-membered ring with the nitrogen atom of the nitroxide group or the carbon atom to which they are bonded, such as, for example, 2,2,6,6-tetramethylpiperidin-1-oxyl (TEMPO) or 4-hydroxy-2,2,6,6-tetraethylpiperidin-1-oxyl (OH-TEMPO), mixtures of the abovementioned inhibitors, mixtures of the abovementioned inhibitors with oxygen, for example in the form of air, and mixtures of mixtures of the abovementioned inhibitors with oxygen, for example in the form of air. Preferred inhibitors are the abovementioned sterically hindered nitroxides, cerium(III) compounds and sterically hindered phenols and mixtures thereof with one another and mixtures of such inhibitors with oxygen and mixtures of mixtures of these inhibitors with oxygen, for example in the form of air. Particularly preferred inhibitor systems are those which comprise at least one sterically hindered nitroxide and a further component selected from a sterically hindered phenol and a cerium(III) compound, and mixtures thereof with oxygen, for example in the form of air. The amount of inhibitor may be up to 2% by weight, based on the total amount of anhydride+compound P. The inhibitors are advantageously used in amounts of from 10 ppm to 1000 ppm, based on the total amount of anhydride+compound P. In the case of inhibitor mixtures, these data relate to the total amount of components, with the exception of oxygen.

The reaction according to the invention of compound P with (meth)acrylic anhydride leads naturally primarily to a mixture of the poly-$C_2$-$C_4$-alkylene glycol mono(meth)acrylic acid ester with acrylic acid or methacrylic acid and, if appropriate, residues of excess anhydride and unreacted poly-$C_2$-$C_4$-alkylene glycol P.

However, the excess anhydride accounts, as a rule, for not more than 10% by weight and in particular not more than 5% by weight of the originally used amount of (meth)acrylic anhydride A. It has proven useful to destroy any anhydride present by reaction with water. The proportion of unreacted poly-$C_2$-$C_4$-alkylene glycol compound P is preferably not more than 10% by weight and in particular not more than 5% by weight of the amount of compound P used.

For the separation of the poly-$C_2$-$C_4$-alkylene glycol mono(meth)acrylic acid ester from the acrylic acid or methacrylic acid formed in the reaction, the latter can be removed in principle by a distillation method or in another manner, for example by extraction of the acid. It is also possible to isolate the ester, for example by crystallization of the ester from an aqueous medium, the acid and any anhydride present remaining in the mother liquor. As a rule, however, no isolation or separation of the poly-$C_2$-$C_4$-alkylene glycol mono(meth)acrylic acid ester is carried out. Rather, the mixture of poly-$C_2$-$C_4$-alkylene glycol mono(meth)acrylic acid ester with acrylic acid and/or methacrylic acid is preferably subjected to a free radical copolymerization, if appropriate with addition of further acrylic acid and/or methacrylic acid and, if appropriate, further ethylenically unsaturated monomers.

With regard to the use of the copolymers obtainable in the polymerization according to the invention, a molar ratio of poly-$C_2$-$C_4$-alkylene glycol mono(meth)acrylic acid ester to (methacrylic acid in the range from 1:1 to 1:20 and in particular in the range from 1:1 to 1:8 is preferably established in the monomer mixture to be polymerized according to the invention.

In addition to the abovementioned monomers, the monomer mixture to be polymerized in the process according to the invention may also comprise further monomers differing from the abovementioned monomers. These include in particular monoethylenically unsaturated monomers (monomers C). Examples of these are C1 monoethylenically unsaturated mono- and dicarboxylic acids having 3 to 8 carbon atoms, such as crotonic acid, isocrotonic acid, maleic acid, fumaric acid and itaconic acid, C2 alkyl esters of monoethylenically unsaturated mono- and di-$C_3$-$C_8$-carboxylic acids, in particular of acrylic acid and of methacrylic acid with $C_1$-$C_{10}$-alkanols or $C_3$-$C_{10}$-cycloalkanols, such as methyl acrylate, ethyl acrylate, n-propyl acrylate, isopropyl acrylate, n-butyl acrylate, isobutyl acrylate, tert-butyl acrylate, n-hexyl acrylate, 2-ethylhexyl acrylate, cyclohexyl acrylate and the corresponding methacrylic acid esters, C3 hydroxyalkyl esters of monoethylenically unsaturated mono- and di-$C_3$-$C_8$-carboxylic acids in particular of acrylic acid and of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate and 4-hydroxybutyl methacrylate, C4 monoethylenically unsaturated nitriles, such as acrylonitrile, C5 vinylaromatic monomers, such as styrene and vinyltoluenes, C6 monoethylenically unsaturated sulfonic acids and phosphonic acids and salts thereof, in particular alkali metal salts thereof, such as vinylsulfonic acid, allylsulfonic acid, methallylsulfonic acid, styrenesulfonic acid, 2-acryloyloxy-ethanesulfonic acid, 2-acrylamido-2-methylpropanesulfonic acid, vinylphosphonic acid, allylphosphonic acid, 2-acryloyloxyethanephosphonic acid and 2-acrylamido-2-methylpropanephosphonic acid, and C7 monomers carrying amino groups, and protonation and quaternization products thereof, such as 2-(N,N-dimethylamino)ethyl acrylate, 2-(N,N-dimethylamino)ethyl methacrylate, 3-(N,N-dimethylamino)propyl acrylate, 2-(N,N-dimethylamino)-propyl methacrylate, 2-(N,N,N-trinmethylammonium)ethyl acrylate, 2-(N,N,N-trimethylammonium)ethyl methacrylate, 3-(N,N,N-trimethylammonium)propyl acrylate and 2-(N,N,N-trimethylammonium)propyl methacrylate in the form of their chlorides, sulfates and methosulfates.

Preferred monomers C are the monomers C1, C3 and C6. The proportion of monoethylenically unsaturated monomers, based on the total amount of the monomers to be polymerized, will as a rule not exceed 30% by weight and in particular 10% by weight. In a particularly preferred embodiment, none or less than 1% by weight, based on the total amount of the monomers C to be polymerized, is used.

For increasing the molecular weight of the polymers, it may also be expedient to carry out the copolymerization in the presence of small amounts of polyethylenically unsaturated monomers having, for example, 2, 3 or 4 polymerizable double bonds (crosslinking agents). Examples of these are diesters and triesters of ethylenically unsaturated carboxylic acids, in particular the bis- and trisacrylates of diols or polyols having 3 or more OH groups, for example the bisacrylates and the bismethacrylates of ethylene glycol, diethylene glycol, triethylene glycol, neopentylglycol or polyethylene glycols. Such crosslinking agents are, if desired, used in an amount of, as a rule, from 0.01 to 5% by weight, based on the total amount of the monomers to be polymerized. Preferably less than 001% by weight of crosslinking monomers is used and in particular no crosslinking monomers are used.

The copolymerization, according to the invention, of poly-$C_2$-$C_4$-alkylene glycol mono(meth)acrylic acid esters with acrylic acid and/or methacrylic acid and, if appropriate, further monomers is usually effected in the presence of compounds forming free radicals, so-called initiators. The initiators are usually used in amounts of up to 30% by weight, preferably from 0.05 to 15% by weight, in particular from 0.2 to 8% by weight, based on the monomers to be polymerized. In the case of initiators consisting of a plurality of components (initiator systems, e.g. in the case of redox initiator systems), the above weight data are based on the sum of the components.

Suitable initiators are, for example, organic peroxides and hydroperoxides, and furthermore peroxodisulfates, percarbonates, peroxide esters, hydrogen peroxide and azo compounds. Examples of initiators are hydrogen peroxide, dicyclohexyl peroxodicarbonate, diacetyl peroxide, di-tert-butyl peroxide, diamyl peroxide, dioctanoyl peroxide, didecanoyl peroxide, dilauroyl peroxide, dibenzoyl peroxide, bis(o-toluoyl)peroxide, succinyl peroxide, methyl ethyl ketone peroxide, di-tert-butyl hydroperoxide, acetylacetone peroxide, butyl peracetate, tert-butyl permaleate, tert-butyl perisobutyrate, tert-butyl perpivalate, tert-butyl peroctanoate, tert-butyl perneodecanoate, tert-butyl perbenzoate, tert-butyl hydroperoxide, cumyl hydroperoxide, tert-butyl perneodecanoate, tert-amyl perpivalate, tert-butyl perpivalate, tert-butyl perbenzoate, tert-butyl peroxy-2-ethylhexanoate and diisopropyl peroxydicarbamate; furthermore lithium, sodium, potassium and ammonium peroxodisulfate, azo initiators, such as 2,2'-azobisisobutyronitrile, 2,2'-azobis(2-methylbutyronitrile), 2,2'-azobis-2-methyl-N-(2-hydroxyethyl)propionamide, 1,1'-azobis(1 cyclohexanecarbonitrile), 2,2'-azobis(2,4-dimethylvaleronitrile), 2,2'-azobis-(N,N'-dimethyleneisobutyroamidine) dihydrochloride and 2,2'-azobis(2-amidinopropane) dihydrochloride, and the redox initiator systems explained below.

Redox initiator systems comprise at least one peroxide-containing compound in combination with a redox coinitiator, for example a reducing sulfur compound, e.g. bisulfites, sulfites, thiosulfates, dithionites and tetrathionates of alkali metals or of ammonium compounds. Thus, it is possible to use combinations of peroxodisulfates and alkali metal or ammonium hydrogen sulfites, e.g. ammonium peroxodisulfate and ammonium disulfite. The amount of the peroxide-containing compound relative to the redox coinitiator is from 30:1 to 0.05:1.

The initiators can be used alone or as a mixture with one another, for example mixtures of hydrogen peroxide and sodium peroxodisulfate.

The initiators can be either water-soluble or water-insoluble or only slightly soluble in water. For the polymerization in an aqueous medium, water-soluble initiators are preferably used, i.e. initiators which are soluble in the aqueous polymerization medium in the concentration usually used for the polymerization. These include peroxodisulfates, azo initiators having ionic groups, organic hydroperoxides having up to 6 carbon atoms, acetone hydroperoxide, methyl ethyl ketone hydroperoxide and hydrogen peroxide, and the above-mentioned redox initiators.

In combination with the initiators or the redox initiator systems, transition metal catalysts may additionally be used, for example salts of iron, cobalt, nickel, copper, vanadium and manganese. Suitable salts are, for example, iron(II) sulfate, cobalt(II) chloride, nickel(II) sulfate or copper(I) chloride. The reducing transition metal salt is used in a concentration of from 0.1 ppm to 1000 ppm, based on the monomers. Thus, combinations of hydrogen peroxide with iron(II) salts, such as, for example, from 0.5 to 30% of hydrogen peroxide and from 0.1 to 500 ppm of Mohr's salt, may be used.

Redox coinitiators and/or transition metal catalysts, e.g. benzoin, dimethylaniline, ascorbic acid and complexes of heavy metals, such as copper, cobalt, iron, manganese, nickel and chromium, which are soluble in organic solvents, can be concomitantly used also in the copolymerization according to the invention in organic solvents. The amounts of redox coinitiators or transition metal catalysts usually used are from about 0.1 to 1000 ppm, based on the amounts of monomers used.

In order to control the average molecular weight of the polymers obtainable according to the invention, it is often expedient to carry out the copolymerization according to the invention in the presence of regulators. Conventional regulators, in particular organic compounds comprising SH groups, in particular water-soluble compounds comprising SH groups, such as 2-mercaptoethanol, 2-mercaptopropanol, 3-mercaptopropionic acid, cysteine, N-acetylcysteine, furthermore phosphorus(III) or phosphorus(I) compounds, such as alkali metal or alkaline earth metal hypophosphites, e.g. sodium hypophosphite, and hydrogen sulfites, such as sodium hydrogen sulfite, can be used for this purpose. The polymerization regulators are generally used in amounts of from 0.05 to 10% by weight, in particular from 0.1 to 2% by weight, based on the monomers. Preferred regulators are the abovementioned compounds carrying SH groups, in particular water-soluble compounds carrying SH groups, such as 2-mercaptoethanol, 2-mercaptopropanol, 3-mercaptopropionic acid, cysteine and N-aacetylcysteine. In the case of these compounds, it has proven particularly useful to use them in an amount of from 0.05 to 2% by weight, in particular from 0.1 to 1% by weight, based on the monomers. The abovementioned phosphorus(III) and phosphorus(I) compounds and the hydrogen sulfites are usually used in relatively large amounts, for example from 0.5 to 10% by weight and in particular from 1 to 8% by weight, based on the monomers to be polymerized. The average molecular weight can also be influenced by the choice of the suitable solvent. Thus, the polymerization in the presence of diluents having benzylic or allylic H atoms leads to a reduction in the average molecular weight by chain transfer.

The copolymerization, according to the invention, of poly-$C_2$-$C_4$-alkylene glycol mono(meth)acrylic acid esters with acrylic acid and/or methacrylic acid can be effected by the conventional polymerization processes, including solution, precipitation, suspension or mass polymerization. The solution polymerization method, i.e. the polymerization in solvents or diluents, is preferred.

The suitable solvents or diluents include both aprotic solvents, for example the abovementioned aromatics, such as toluene, o-xylene, p-xylene, cumene, chlorobenzene, ethylbenzene, industrial mixtures of alkyl aromatics, aliphatics and cycloaliphatics, such as cyclohexane and industrial aliphatic mixtures, ketones, such as acetone, cyclohexanone and methyl ethyl ketone, ethers, such as tetrahydrofuran, dioxane, diethyl ether and tert-butyl methyl ether, and $C_1$-$C_4$-alkyl esters of aliphatic $C_1$-$C_4$-carboxylic acids, such as methyl acetate and ethyl acetate, and furthermore protic solvents, such as glycols and glycol derivatives, polyalkylene glycols and derivatives thereof, $C_1$-$C_4$-alkanols, e.g. n-propanol, n-butanol, isopropanol, ethanol or methanol, and water and mixtures of water with $C_1$-$C_4$-alkanols, such as, for example, isopropanol/water mixtures. The copolymerization process according to the invention is preferably effected in water or a mixture of water with up to 60% by weight of $C_1$-$C_4$-alkanols or glycols as solvents or diluents. Particularly preferably, water is used as the sole solvent.

The copolymerization process according to the invention is preferably carried out with the substantial or complete exclusion of oxygen, preferably in an inert gas stream, for example a nitrogen stream.

The copolymerization process according to the invention can be carried out in the apparatuses customary for polymerization methods. These include stirred vessels, stirred vessel cascades, autoclaves, tubular reactors and kneaders.

The copolymerization process according to the invention is usually effected at temperatures in the range from 0 to 300° C., preferably in the range from 40 to 120° C. The duration of the polymerization is usually in the range from 0.5 h to 15 h and in particular in the range from 2 to 6 h. The pressure prevailing during the polymerization is of minor importance for the success of the polymerization and is as a rule in the range from 800 mbar to 2 bar and frequently ambient pressure. With the use of readily volatile solvents or readily volatile monomers, the pressure may even be higher.

Depending on the choice of the polymerization conditions, the copolymers obtainable according to the invention have, as a rule, weight average molecular weights ($M_w$) in the range from 1000 to 200 000. With regard to the use of the polymers, those having a weight average molecular weight of from 5000 to 100 000 are preferred. The weight average molecular weight $M_w$ can be determined in the conventional manner by gel permeation chromatography, as explained in the examples. The K values of the copolymers obtainable according to the invention, determined by the method stated below, are preferably in the range from 20 to 45.

If the process according to the invention is carried out as solution polymerization in water, removal of the water is not necessary for many intended uses. Moreover, isolation of the polymer obtainable according to the invention can be carried out in a customary manner, for example by spray drying of the polymerization mixture. If the polymerization is carried out in a steam-volatile solvent or solvent mixture, the solvent can be removed by passing in steam, with the result that an aqueous solution or dispersion of the copolymer is obtained.

The copolymers are preferably obtained in the form of an aqueous dispersion or solution. The solids content is preferably from 10 to 80% by weight, in particular from 30 to 65% by weight.

The copolymers of (meth)acrylic acid with poly-$C_2$-$C_4$-alkylene glycol mono(meth)acrylic acid obtainable according to the invention, in particular the copolymers of methacrylic acid with polyethylene glycol mono($C_1$-$C_{10}$-alkyl) monomethacrylates, are outstandingly suitable as additives for cement-containing preparations, such as concrete or mortar, and are distinguished in particular by superior properties with regard to their plasticizing effect. The present invention therefore also relates to the copolymers obtainable by the process according to the invention and in particular copolymers of polyethylene glycol mono($C_1$-$C_4$-alkyl) monomethacrylate with methacrylic acid, and the use thereof in cement-containing preparations, in particular as concrete plasticizers.

Cement is to be understood, for example, as Portland cement, high-alumina cement or mixed cement, such as, for example, puzzolanic cement, slag cement or other types. The copolymers according to the invention are particularly suitable for cement mixes which comprise, as cement components, Portland cement predominantly or in particular in an amount of at least 80% by weight, based on the cement component. For this purpose, the copolymers according to the invention are used as a rule in an amount of from 0.01 to 10% by weight, preferably from 0.05 to 3% by weight, based on the total weight of the cement in the cement preparation.

The polymers can be added in solid form or as aqueous solution to the ready-to-use cement-containing preparation. It is also possible to formulate copolymers present in solid form with the cement and to prepare the ready-to-use cement-containing preparations therefrom. Preferably, the copolymer is used in liquid, i.e. dissolved, emulsified or suspended, form, for example in the form of the polymerization solution obtained from the preparation, in the preparation of the cement-containing formulation, i.e. during mixing.

The polymers according to the invention can also be used in combination with the known concrete plasticizers and/or concrete flow improvers based on naphthalene/formaldehyde condensate sulfonate, melamine/formaldehyde condensate sulfonate, phenolsulfonic acid/formaldehyde condensate, ligninsulfonates and gluconates. Furthermore, they can be used together with celluloses, for example alkyl- or hydroxyalkylcelluloses, starches or starch derivatives. They can also be used in combination with high molecular weight polyethylene oxides (weight average molecular weight $M_w$ in the range of from 100 000 to 8 000 000).

Furthermore, conventional additives, such as air-entraining agents, expansion agents, water repellents, retarders, accelerators, antifreezes, waterproofing compounds, pigments, corrosion inhibitors, plasticizers, grouting aids, stabilizers or hollow microspheres, can be mixed with the cement-containing formulation. Such additives are described, for example, in EN 934.

In principle, the polymers according to the invention can also be used together with film-forming polymers. These are to be understood as meaning those polymers whose glass transition temperature is $\leq 65°$ C., preferably $\leq 50°$ C., particularly preferably $\leq 25°$ C. and very particularly preferably $\leq 0°$ C. On the basis of the relationship between the glass transition temperature of homopolymers and the glass transition temperature of copolymers, postulated by Fox (T. G. Fox, Bull, Am. Phys. Soc. (Ser. II) 1, 1956, 123, the person skilled in the art is able to choose suitable polymers. Examples of suitable polymers are the styrene/butadiene polymers and styrene/acrylates commercially available for this purpose (cf. for example H. Lutz in D. Distler (editor) "Wässrige Polymerdispersionen", Wiley-VCH, Weinheim 1999, Chapters 10.3 and 10.4, pages 230-252).

Furthermore, it is often advantageous if the polymers according to the invention are used together with antifoams. This prevents too much air in the form of air voids from being introduced into the concrete during the preparation of the ready-to-use mineral building materials, which pores would reduce the strength of the set mineral building material, Suitable antifoams comprise in particular polyalkylene oxide-based antifoams, trialkyl phosphates, such as tributyl phosphate, and silicon-based antifoams. The ethoxylation products and the propoxylation products of alcohols having 10 to 20 carbon atoms are likewise suitable. The diesters of alkylene glycols or polyalkylene glycols and further conventional antifoams are likewise suitable. Antifoams are usually used in amounts of from 0.05% by weight to 10% by weight and preferably from 0.5 to 5% by weight, based on the polymers.

The antifoams can be combined with the polymer in various ways. If, for example, the polymer is present as aqueous solution the antifoam can be added in solid form or in solution to the polymer solution. If the antifoam is not soluble in the aqueous polymer solution, emulsifiers or protective colloids may be added for stabilizing it.

If the polymer according to the invention is present in the form of a solid, as obtained, for example, from spray during or fluidized-bed spray granulation, the antifoam can be admixed as a solid or can be compounded together with the polymer during the spray drying process or the spray granulation process.

The following examples are intended to illustrate the invention.

Analysis:

a) Determination of the K Value:

The K values of the aqueous sodium salt solutions of the copoly ers were determined according to H. Fikentscher, Cellulose-Chemie, Volume 13, 53-64 and 71-74 (1932) in aqueous solution at a pr of 7, a temperature of 25° C.

and a polymer concentration of the sodium salt of the copolymer of 1% by weight.

b) Determination of the Solids Content

The determination is effected by means of the MA30 analytical balance from Satorius. For this purpose, a defined amount of the sample (about 0.5 to 1 g) is weighed into an aluminum dish and dried at 90° C. to constant weight. The percentage solids content (SC) is calculated as follows: SC=final weight×100/sample weight [% by weight]

c) Molecular Weight Determination:

The determination of the number average and weight average molecular weight was effected by gel permeation chromatography GPa) using aqueous eluents.

The GPC was carried out using an apparatus combination from Agilent (series 1100). This comprises:

| Gasifier | Model G 1322 A |
| Isocratic pump | Model G 1310 A |
| Autosampler | Model G 1313 A |
| Column oven | Model G 1316 A |
| Control module | Model G 1323 B |
| Differential refractometer | Model G 1362 A |

The eluent used in the case of polymers dissolved in water is a 0.08 mol/l TRIS buffer (pH=7.0) in distilled water+ 0.15 mol/l of chloride ions from NaCl and HCl.

The separation took place in a separating column combination. Column No. 787 and 788 (8×30 mm each) from PSS with GRAL BIO linear separation material are used. The flow rate was 0.8 ml/min at a column temperature of 23° C.

The calibration is effected using polyethylene oxide standards from PPS, having molecular weights of M=194=1 700 000 [mol/g].

d) NMR Analysis (Determination of Conversion)

For determining the conversion of the polyalkylene glycol, samples were taken at different times from the reaction mixture, and a little trifluoroacetic acid was added to said samples. The samples were investigated by means of $^1$H-NMR spectroscopy at 20° C., the reference signal used being the signal of the terminal group of the polyalkylene glycol (in the case of a polyalkylene glycol methyl ether, the signal at 3.4 ppm), which coincides for the starting material and the product. For determining the conversion, the integral of a signal characteristic for the reaction product, as a rule the signal of the methylene protons on the oxygen of the ester group (as a rule at about 4.3 ppm), was determined and was related to the integral of the terminal group.

B Preparation of the poly-$C_2$-$C_4$-alkylene glycol mono(meth)acrylic acid ester:

COMPARATIVE EXAMPLE 1

350 g of polyethylene glycol monomethyl ether (M=1000 g/mol), 57.74 g of methacrylic anhydride, 0.315 g of 2,6-di-tert-butyl-4-methylphenol, 0.031 g of 4-hydroxy-N,N-2,2,6,6-tetramethylpiperidin-1-oxyl and 3.50 g of triethylamine were introduced in succession into a 1 l glass reactor preheated to 80° C. and having an anchor stirrer, thermometer and reflux condenser. The content was then allowed to react for 6 hours while stirring at 80° C. Thereafter, 224.43 g of demineralized water were added and stirring was effected for a further 5 hours at 80° C. Finally, the reactor content was cooled.

The conversion was monitored (before addition of water) by $^1$H-NMR spectrometry. For this purpose, samples (about 100 mg) were taken from the reaction mixture after 60, 180 and 360 minutes, dissolved in 1 ml of deuterated chloroform with addition of 1 drop of trifluoroacetic acid and measured. Here, the conversion corresponds to the quotient of the amount of the polyethylene glycol monomethyl ether used and the amount of the polyethylene glycol monomethyl ether monomethacrylate formed. The results are listed in table 1.

EXAMPLE 1

350 g of methylpolyethylene glycol (M=1000 g/mol), 0.315 g of 2,6-di-tert-butyl-4-methylphenol, 31 mg of 4-hydroxy-N,N-2,2,6,6-tetramethylpiperidin-1-oxyl and 5.56 g of sodium carbonate (anhydrous) were initially taken in a 1 l glass reactor having an anchor stirrer, thermometer, gas feed pipe, reflux condenser and dropping funnel. The mixture was heated to 80° C. while passing in air. Thereafter, 57.74 g of methacrylic anhydride were added and the reaction was allowed to take place for 3 hours at 80° C. Thereafter, 225.4 g of water were added and the mixture was allowed to cool to room temperature.

The conversion was determined in each case 10, 60 and 180 minutes after addition of the methacrylic anhydride by taking a sample by the method described for comparative example 1. The results are listed in table 1

EXAMPLE 2

350 g of methylpolyethylene glycol (M=4714 g/mol), 70.0 mg of 2,6-di-tert-butyl-4-methylphenol, 7.0 mg of 4-hydroxy-N,N-2,2,6,6-tetramethylpiperidin-1-oxyl and 1.219 g of sodium carbonate (anhydrous) were initially taken in a 1 l glass reactor having an anchor stirrer, thermometer, gas feed pipe, reflux condenser and dropping funnel. The mixture was heated to 80° C. while passing in air. Thereafter, 12.55 g of methacrylic anhydride were added and the reaction was allowed to take place for 3 hours at 80° C. Thereafter, 196.7 g of water were added and the mixture was allowed to cool to room temperature.

The conversion was determined in each case 15, 75 and 180 minutes after addition of the methacrylic anhydride by taking a sample by the method described for comparative example 1. The results are listed in table 1

EXAMPLE 3

375 g of methylpolyethylene glycol (M=4714 g/mol), 37.5 g of toluene and 2.23 g of 50% strength by weight aqueous potassium hydroxide solution were initially taken in a 1 l glass reactor having an anchor stirrer, thermometer, gas feed pipe and distillation bridge and dropping funnel. The mixture was heated to an internal temperature of 140° C. and toluene and water were distilled off completely while passing in nitrogen. Thereafter, the mixture was cooled to 90° C., air was passed in, and 2.9 mg of 4-hydroxy-N,N-2,2,6,6-tetramethylpiperidin-1-oxyl, 194.7 mg of 2,6-di-tert-butyl-4-methylphenol and 12.88 g of methacrylic anhydride were added in succession. The reaction was allowed to continue for three hours at 90° C. while stirring, the conversion was checked by means of $^1$H-NMR spectroscopy, dilution was effected with 210.30 g of water and the mixture was cooled to room temperature.

EXAMPLE 4

450 g of methylpolyethylene glycol (M=1000 g/mol), 90 g of toluene and 9.0 g of 50% strength by weight aqueous sodium hydroxide solution were initially taken in a 1 l glass reactor having an anchor stirrer, thermometer, gas feed pipe, distillation bridge and dropping funnel and were heated to an internal temperature of 140° C. Toluene and water were distilled off completely while passing in nitrogen. Thereafter, the mixture was cooled to 90° C., air was passed in, and 17.7 mg of 4-hydroxy-N,N-2,2,6,6-tetramethylpiperidin-1-oxyl, 17.7 mg of cerium(III) acetate and 79.78 g of methacrylic anhydride were added in succession. The mixture was allowed to react for three hours at 90° C. while stirring, the conversion was checked by means of $^1$H-NMR spectroscopy and dilution was effected with 292.50 g of water and the mixture was cooled to room temperature.

EXAMPLE 5

350 g of methylpolyethylene glycol (M=1000 g/mol), 0.321 g of 2,6-di-tert-butyl-4-methylphenol, 32.1 mg of 4-hydroxy-N,N-2,2,6,6-tetramethylpiperidin-1-oxyl and 5.56 g of sodium carbonate (anhydrous) were initially taken in a 1 l glass reactor having an anchor stirrer, thermometer, gas feed pipe, reflux condenser and dropping funnel. The mixture was heated to 80° C. while passing in air.

Thereafter, 57.74 g of methacrylic anhydride were added and the reaction was allowed to take place for 3 hours at 80° C. Thereafter, dilution with 226 g of water was effected and the mixture was cooled to room temperature.

The conversion was determined in each case 10, 60 and 180 minutes after addition of the methacrylic anhydride by taking a sample by the method described for comparative example 1. The results are listed in table 1.

TABLE 1

Conversion in the reaction as a function of time

| Comparative example 1 | | Example 1 | | Example 2 | | Example 5 | |
| --- | --- | --- | --- | --- | --- | --- | --- |
| Time [min] | Conversion [%] | Time [min] | Conversion [%] | Time [min] | Conversion [%] | Time [min] | Conversion [%] |
| 60 | 40 | 15 | 63 | 10 | 90 | 10 | 83 |
| 180 | 55 | 75 | 91.5 | 60 | 99 | 60 | 100 |
| 360 | 68 | 180 | >98 | 180 | 100 | 180 | 100 |

The conversions shown in the table and determined by quantitative $^1$H-NMR spectrometry show that higher reaction rates and, associated therewith, higher yields are achieved by the process according to the invention. Furthermore, in the examples according to the invention, no more methacrylic anhydride is detectable after a reaction time of 3 hours, whereas methacrylic anhydride is still present in the comparative example even after 6 hours.

C Polymerization Process

COMPARATIVE EXAMPLE 2

359.63 g of water were initially taken in a 1, l glass reactor having an anchor stirrer, thermometer, nitrogen feed pipe, reflux condenser and a plurality of feed vessels and were heated to 80° C. While passing in nitrogen, at an internal temperature of 80° C., the following feeds 1 and 2 were then metered in continuously, beginning at the same time, over a period of 4 hours at a constant feed rate. To complete the copolymerization, polymerization was then allowed to continue for 1 hour at 80° C. Thereafter, the mixture was cooled to room temperature and was neutralized with 50% strength sodium hydroxide solution.

The solution obtained had a solids content of 34.4% by weight and a pH of 6.7. The K value of the polymer was 36.5.

Feed 1: Mixture of 389.23 g of the aqueous mixture from comparative example 1 with 18.60 g of methacrylic acid and 2.72 g of 3-mercaptopropyltrimethoxysilane Feed 2: 1.90 16.0 g of ammonium peroxodisulfate dissolved in 17.11 g of water.

POLYMERIZATION EXAMPLE P1

384.75 g of water were initially taken in a 1 l glass reactor having an anchor stirrer, thermometer, nitrogen feed pipe, reflux condenser and a plurality of feed vessels and were heated to 80° C. While passing in nitrogen, at an internal temperature of 80° C. while stirring, the feeds 1 and 2 were then metered in continuously, beginning at the same time, in the course of 4 h at a constant feed rate. To complete the copolymerization, polymerization was allowed to continue for a further hour after the end of the feeds, and the reactor content was then cooled and was neutralized with 50% strength sodium hydroxide solution.

The solution obtained had a solids content of 34.1% by weight and a pH of 6.8. The K value of the polymer was 37.0.

Feed 1: Mixture of 390.92 g of the aqueous solution obtained in example 1 with 31.58 g of methacrylic acid and 2.86 g of 3-mercaptopropyltrimethoxysilane Feed 2: 2.00 g of ammonium persulfate dissolved in 18.00 g of water.

POLYMERIZATION EXAMPLE P2

295.37 g of water were initially taken in a 1 l glass reactor having an anchor stirrer thermometer, nitrogen feed pipe, reflux condenser and a plurality of feed vessels and were heated to 60° C. While passing in nitrogen, at an internal temperature of 60° C. while stirring, beginning at the same time, feed 1 was added continuously in the course of 4 h and feed 2 in the course of 4.5 h. To complete the copolymerization, polymerization was allowed to continue for a further hour after the end of the feeds and the reactor content was then cooled and was neutralized with 25% strength sodium hydroxide solution.

The solution obtained had a solids content of 29.3% by weight and a pH of 6.9, The K value of the polymer was 43.6, the number average molecular weight $M_n$ was 21 000 and the weight average molecular weight $M_w$ was 65 000 Dalton.

Feed 1: Mixture of 250 g of the solution obtained in example 2 with 10.16 g of methacrylic acid and 0.97 g of mercaptoethanol.

Feed 2: 24.55 g of aqueous sodium peroxodisulfate solution (7% by weight)

POLYMERIZATION EXAMPLE P3

289.02 g of water were initially taken in a 1 l glass reactor having an anchor stirrer, thermometer, nitrogen feed pipe, reflux condenser and a plurality of feed vessels and were heated to 60° C. While passing in nitrogen, at an internal temperature of 60° C. while stirring, beginning at the same time, feed 1 was metered in continuously in the course of 4 h and feed 2 in the course of 4.5 h. To complete the copolymerization, polymerization was allowed to continue for a further hour after the end of the feeds and the reactor content was then cooled and was neutralized with 25% strength sodium hydroxide solution.

The solution obtained had a solids content of 29.6% by weight and a pH of 6.8. The K value of the polymer was 44.1, the number average molecular weight $M_n$ was 16 400 and the weight average molecular weight $M_w$ was 89 000 Dalton.

Feed 1: Mixture of 250 g of the solution obtained in example 2 with 4.26 g of methacrylic acid and 0.41 g of mercaptoethanol.

Feed 2: 15.56 g of aqueous sodium peroxodisulfate solution (7% by weight)

POLYMERIZATION EXAMPLE P4

216 g of water were initially taken in a 1 l glass reactor having an anchor stirrer, thermometer, nitrogen feed pipe, reflux condenser and a plurality of feed vessels and were heated to 60° C. While passing in nitrogen, at an internal temperature of 60° C. while stirring, beginning at the same time, feed 1 and feed 2 were metered in continuously in the course of 4 h. After the end of the feeds, a further 0.24 g of sodium peroxodisulfate dissolved in 5.88 g of water was metered in the course of 1 hour and the polymerization was allowed to continue for a further hour at 60° C. The reactor content was cooled and was neutralized with 50% strength sodium hydroxide solution.

The solution obtained had a solids content of 30.0% by weight and a pH of 7.2. The K value of the polymer was 40.3, the number average molecular weight $M_n$ was 10 000 and the weight average molecular weight $M_w$ was 48 400 Dalton.

Feed 1: Mixture of 258.5 g of the solution obtained in example 3 with 11.51 g of methacrylic acid, 0.96 g of mercaptoethanol and 77.5 g of water.

Feed 2: 1.47 g of sodium peroxodisulfate dissolved in 35.25 g of water

POLYMERIZATION EXAMPLE P5

228.16 g of water were initially taken in a 1 l glass reactor having an anchor stirrer, thermometer, nitrogen feed pipe, reflux condenser and a plurality of feed vessels and were heated to 80° C. While passing in nitrogen, at an internal temperature of 80° C. while stirring, beginning at the same time, feed 1 and feed 2 were metered in continuously in the course of 4 h. After the end of the feeds, a further 0.77 g of ammonium peroxodisulfate, dissolved in 6.90 g of water, was metered in the course of 1 hour and the polymerization was finally allowed to continue for a further hour at 8000. The reactor content was cooled and was neutralized with 30% strength sodium hydroxide solution.

The solution obtained had a solids content of 40.5% by weight and a pH of 7.0. The K value of the polymer was 37.5, the number average molecular weight $M_n$ was 8800 and the weight average molecular weight $M_w$ was 39 500 Dalton.

Feed 1: Mixture of 395.4 g of the solution obtained in example 4 with 45.5 g of methacrylic acid, 2.42 g of mercaptoethanol.

Feed 2: 3.07 g of sodium peroxodisulfate, dissolved in 27.6 g of water

POLYMERIZATION EXAMPLE P6

255 g of water were initially taken in a 1 l glass reactor having an anchor stirrer, thermometer, nitrogen feed pipe, reflux condenser and a plurality of feed vessels and were heated to 100° C. (reflux). While passing in nitrogen, at an internal temperature of 100° C. while stirring, beginning at the same time, feed 1 was metered in continuously in the course of 5 h and feeds 2 and 3 were metered in continuously in the course of 5 h 15 min. To complete the copolymerization, polymerization was allowed to continue for a further hour after the end of the feeds, and the reactor content was then cooled and was neutralized with 50% strength sodium hydroxide solution.

The solution obtained had a solids content of 40.4% by weight and a pH of 6.5. The K value of the polymer was 36.9, the number average molecular weight $M_n$ was 8200 and the weight average molecular weight $M_w$ was 39 500 Dalton.

Feed 1: Mixture of 200 g of the aqueous solution obtained in example 1 with 25.25 g of methacrylic acid and 45.1 g of water Feed 2: 22.52 g of aqueous sodium peroxodisulfate solution (15% by weight)

Feed 3: 17.51 g of aqueous sodium hypophosphite solution (45% by weight)

D Testing of Performance Characteristics of the Polymers P1 to P6 as Concrete Plasticizers:

The test was effected by the test method for concrete plasticizers which is explained in more detail below and is based on ESN 196 or DIN 18555 Part 2:

Apparatuses:
Mixer type 203 (from Testing Bluhm und Feuerhard GmbH)
Stopwatch
Laboratory balance (accuracy+/−1 g)
Flow table d=300 mm (from Testing Bluhm und Feuerhard GmbH)
Slump cone
Dropping funnel with tube connection
Spoon
Apparatus for measuring air void content (from Testing Biuhm und Feuerhard GmbH)
Vibrating table type 2.0233 (from Testing Bluhm und Feuerhard GmbH)

Starting Materials:
Cement:Additive 1:3; grading curves 0/2
1000 g each of standard sand CEN I, CEN II and DEN III;
1000 g of Heidelberg cement CEM I 42.5 R (Wetzlar works);
440 g of water: a quotient of mass of water and mass of cement (wc) of 0.44.

Plasticizer: 0.3%, based on the solution of the plasticizer, of a suitable antifoam (e.g. Degresal SD21) is added to the plasticizer 1 day before the test. The plasticizer additive is calculated as solid substance, based on the proportion of cement. The amount of water added by means of the plasticizer is taken into account in the calculation of the total amount of water for adjusting the w/c value.

Test Procedure:

a) Preparation of the Mortar

The total amount of the dry mix (cement+sand) is mixed homogeneously at about 23° for 1 min in a mortar mixer according to DIN EN 196. The wet component (water and aqueous solution of concrete plasticizer+antifoam) is metered in continuously by means of a dropping funnel over a period of about 15 sec. After stirring for a further minute, the preparation of the mortar is complete.

b) Slump Test According to DIN 18555 Part 2

In order to determine the slump, the slump cone is placed in the middle on the glass disk of the flow table and the mortar is introduced in three layers and each layer is compacted with the spoon by pressing down. During the filling, the slump cone is pressed onto the glass plate with a hand. The projecting mortar is scraped off and the free surface of the flow table is, if appropriate, cleaned. Thereafter, the slump cone is slowly pulled vertically upward and the mortar is spread on the glass plate with 15 vertical impacts.

The diameter of the slumped mortar is then measured in two directions at right angles to one another. The result is stated in cm as the arithmetic mean of the two measurements. The determination is effected 5, 30, 60 and 90 minutes after addition of the wet component. Before each measurement, the mortar is stirred up briefly by hand, c) Air Content of the Mortar Based on DIN 18555 Part 2 (Air Voids)

The air content of the fresh mortar is measured using an adjusted tester having a capacity of 1 $dm^3$ by the pressure equalization method. For this purpose, the 1 l container of the apparatus measuring the air void content is filled with mortar without further compaction.

The upper part of the tester is then placed on the cleaned ground edge of the container and the apparatus is closed. The volume of the apparatus which is still free is filled with water. A defined pressure is generated in the chamber. After pressure equalization is complete the air void content is read directly on the scale mounted on the upper part. The air void content, expressed as volume fraction in %, is stated with an accuracy of measurement of 0.1%

TABLE 2

Results of testing of the performance characteristics

| Polymerization example | Dose Plasticizer* | Air voids [%] | Slump [cm] | | | |
|---|---|---|---|---|---|---|
| | | | 5 min | 30 min | 60 min | 90 min |
| Comparative example 2 | 0.2% | 4.0 | 20.9 | 16.7 | 15.5 | 14.7 |
| Example P1 | 0.2% | n.d. | 22.9 | 21.3 | 20.3 | 17.8 |
| Example P2 | 0.2% | 3.9 | 22.5 | 20.8 | 19.7 | 18.4 |
| Example P3 | 0.2% | 4.1 | 16.9 | 16.4 | 15.6 | 14.8 |

TABLE 2-continued

Results of testing of the performance characteristics

| Polymerization example | Dose Plasticizer* | Air voids [%] | Slump [cm] | | | |
|---|---|---|---|---|---|---|
| | | | 5 min | 30 min | 60 min | 90 min |
| Example P4 | 0.2% | 4.1 | 23.0 | 19.3 | 18.7 | 17.2 |
| Example P5 | 0.2% | 3.8 | 24.1 | 20.8 | 19.5 | 17.2 |
| Example P6 | 0.2% | 3.7 | 22.2 | 18.3 | 16.8 | 15.8 |

*The stated dose is based on the mass of solid in the respective plasticizer, based on the mass of cement in the mortar.

The results of the testing of the performance characteristics (table 2) show that the copolymers according to the invention exhibit greater plasticization than the products prepared according to the teaching of the prior art.

We claim:

1. A process for the preparation of poly-$C_2$-$C_4$-alkylene glycol mono(meth)acrylic acid esters by reacting (meth)acrylic anhydride A with a poly-$C_2$-$C_4$-alkylene glycol compound P carrying at least one OH group in the presence of a base, wherein the base is selected from basic compounds which have a solubility in the poly-$C_2$-$C_4$-alkylene glycol compound P of not more than 10 g/l at 90° C., and the molar ratio of (meth)acrylic anhydride to poly-$C_2$-$C_4$-alkylene glycol A:P is in the range from 1:1 to 1.095:1.

2. The process according to claim 1, wherein the basic compound is selected from the group consisting of hydroxides, oxides, carbonates and bicarbonates of monovalent and divalent metals.

3. The process according to claim 1, wherein the basic compound is an alkali metal hydroxide or alkali metal carbonate.

4. The process according to claim 1, wherein the base is used in an amount of from 0.05 to 0.5 base equivalent, based on the poly-$C_2$-$C_4$-alkylene glycol compound P.

5. The process according to claim 1, wherein the reaction of (meth)acrylic anhydride with the compound P is carried out in the presence of a polymerization inhibitor.

6. The process according to claim 5, wherein the polymerization inhibitor is selected from the group consisting of sterically hindered nitroxides, cerium(III) compounds, sterically hindered phenols, mixtures thereof and mixtures thereof with oxygen.

7. The process according to claim 1, wherein the reaction is carried out in a reaction mixture which comprises less than 0.2% by weight of water.

8. The process according to claim 1, wherein the reaction is carried out in the absence of a solvent.

9. The process according to claim 1, wherein the poly-$C_2$-$C_4$-alkylene glycol compound P is a polyethylene glycol mono($C_1$-$C_{10}$-alkyl) ether.

10. The process according to claim 1, wherein the poly-$C_2$-$C_4$-alkylene glycol compound has a number average molecular weight in the range from 400 to 10,000.

11. A process for the preparation of copolymers of (meth)acrylic acid with poly-$C_2$-$C_4$-alkylene glycol mono(meth)acrylic acid esters, comprising:

i) preparation of a poly-$C_2$-$C_4$-alkylene glycol mono(meth)acrylic acid ester by reacting (meth)acrylic anhydride A with a poly-$C_2$-$C_4$-alkylene glycol compound P carrying at least one OH group in the presence of a base according to claim 1, and ii) free radical copolymerization of the poly-$C_2$-$C_4$-alkylene glycol mono(meth)acrylic acid ester obtained in the preparation of i) with acrylic acid and/or methacrylic acid and, optionally, further ethylenically unsaturated monomers.

12. The process according to claim 11, wherein the molar ratio of poly-$C_2$-$C_4$-alkylene glycol mono(meth)acrylic acid ester obtained to (meth)acrylic acid is in the range from 1:1 to 1:20.

13. The process according to claim 11, wherein the polymerization is carried out in the presence of a molecular weight regulator.

14. The process according to claim 13, wherein the molecular weight regulator is used in an amount of from 0.05 to 10% by weight, based on the total amount of the monomers to be polymerized.

15. The process according to claim 11, wherein the polymerization is carried out in an aqueous reaction medium.

16. The process according to claim 11, wherein the poly-$C_2$-$C_4$-alkylene glycol mono(meth)acrylic acid ester is a polyethylene glycol mono-$C_1$-$C_{10}$-alkyl ether monomethacrylate.

17. The process according to claim 11, wherein the poly-$C_2$-$C_4$-alkylene glycol mono(meth)acrylic acid ester obtained in the preparation of i) is copolymerized without isolation in the free radical copolymerization of ii) with acrylic acid and/or methacrylic acid and, optionally, further ethylenically unsaturated monomers.

18. A copolymer of (meth)acrylic acid with poly-$C_2$-$C_4$-alkylene glycol mono(meth)acrylic acid esters, made by the process according to claim 11.

19. The copolymer according to claim 18 of polyethylene glycol mono-$C_1$-$C_{10}$-alkyl ether monomethacrylate with methacrylic acid.

20. A method of plasticizing a cement-containing preparation comprising adding the copolymer of claim 18 to said cement-containing preparations.

21. A composition comprising a cement-containing preparation and the copolymer of claim 18.

22. The process for the preparation of poly-$C_2$-$C_4$-alkylene glycol mono(meth)acrylic acid esters according to claim 1, wherein the molar ratio of (meth)acrylic anhydride to poly-$C_2$-$C_4$-alkylene glycol A:P is in the range from 1.02:1 to 1.08:1.

23. The process for the preparation of poly-$C_2$-$C_4$-alkylene glycol mono(meth)acrylic acid esters according to claim 1, wherein at least 90% conversion of the poly-$C_2$-$C_4$-alkylene glycol is achieved in less than 4 hours.

24. The process according to claim 1, wherein the basic compound is an alkali metal carbonate.

* * * * *